United States Patent
Lever et al.

(10) Patent No.: US 8,885,503 B2
(45) Date of Patent: Nov. 11, 2014

(54) MULTI-CARRIER SATELLITE NETWORK SUPPORTING HETEROGENEOUS TERMINALS

(75) Inventors: Dubi Lever, Hashmonaim (IL); Avraham Avitzour, Har-Adar (IL); Amiram Levinberg, Ramat Gan (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 453 days.

(21) Appl. No.: 13/290,375

(22) Filed: Nov. 7, 2011

(65) Prior Publication Data

US 2012/0114022 A1  May 10, 2012

Related U.S. Application Data

(60) Provisional application No. 61/411,093, filed on Nov. 8, 2010.

(51) Int. Cl.
*H04B 7/185* (2006.01)
*H04B 7/204* (2006.01)

(52) U.S. Cl.
CPC ........ *H04B 7/18515* (2013.01); *H04B 7/18541* (2013.01); *H04B 7/2045* (2013.01)
USPC ............ 370/252; 370/468; 370/316; 375/214

(58) Field of Classification Search
CPC ........... H04B 7/18582; H04B 7/18584; H04B 7/18508; H04L 25/03343; H04L 25/0266; H04L 25/0204
USPC .......... 370/252, 468, 316, 318; 375/214, 220, 375/222, 219
See application file for complete search history.

(56) References Cited

U.S. PATENT DOCUMENTS

| 5,745,839 A * | 4/1998 | Lieberman ...................... 455/10 |
| 6,859,443 B1 * | 2/2005 | Mushkin ....................... 370/324 |

(Continued)

FOREIGN PATENT DOCUMENTS

| EP | 2088691 A2 | 8/2009 |
| WO | 03036999 A1 | 5/2003 |
| WO | 2004/010610 A1 | 1/2004 |
| WO | 2011080299 A2 | 7/2011 |

OTHER PUBLICATIONS

Extended European Search Report—EP11187764.3—Mailing date: Feb. 10, 2014.

*Primary Examiner* — Rasheed Gidado
(74) *Attorney, Agent, or Firm* — Banner & Witcoff, Ltd.

(57) ABSTRACT

In a satellite communication system, comprising a hub and a plurality of heterogeneous terminals, the hub may split a bandwidth segment designated for a forward channel into at least two carriers, wherein some of the terminals may listen on a first carrier and some other terminals may listen on the at least second carrier. In this system, the hub may re-arrange the split of the bandwidth segment between the various carriers populating it in real-time or substantially in real-time, while the carriers are actively transmitted, and without causing loss of service and/or loss of data to terminals listening on those carriers. The terminals may be configured to track the carriers as they are re-arranged and to maintain seamless service to the end user throughout the re-arrangement process.

25 Claims, 4 Drawing Sheets

(56) References Cited

U.S. PATENT DOCUMENTS

| | | | |
|---|---|---|---|
| 7,167,502 B1* | 1/2007 | Tsaur | 375/130 |
| 7,463,707 B2* | 12/2008 | Dale et al. | 375/356 |
| 7,720,510 B2* | 5/2010 | Pescod et al. | 455/562.1 |
| 7,839,900 B1* | 11/2010 | Herder et al. | 370/545 |
| 8,170,467 B2* | 5/2012 | Stoddard | 455/1 |
| 2001/0043574 A1* | 11/2001 | Nguyen et al. | 370/316 |
| 2008/0064323 A1* | 3/2008 | Barda | 455/3.01 |
| 2010/0189164 A1* | 7/2010 | Thind | 375/147 |

\* cited by examiner

Initial State

Before LO Modification

After LO Modification

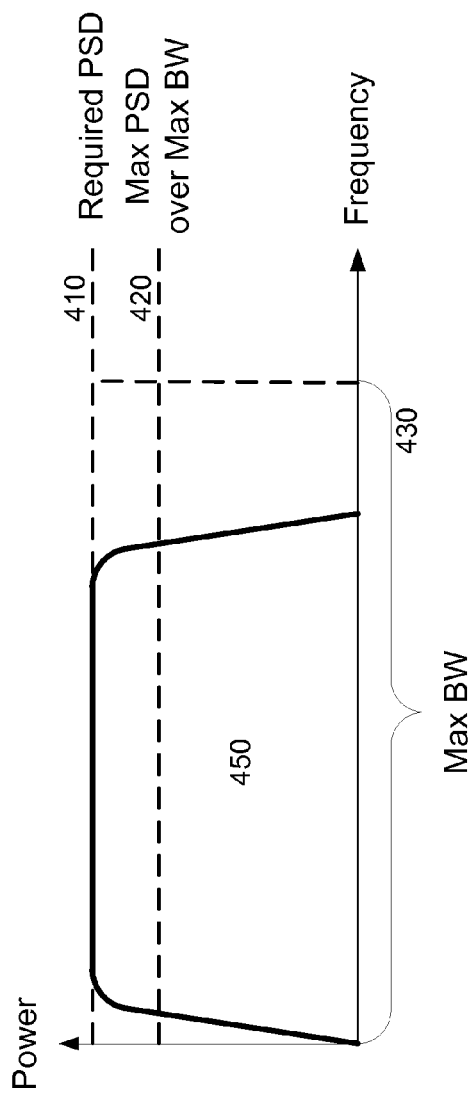
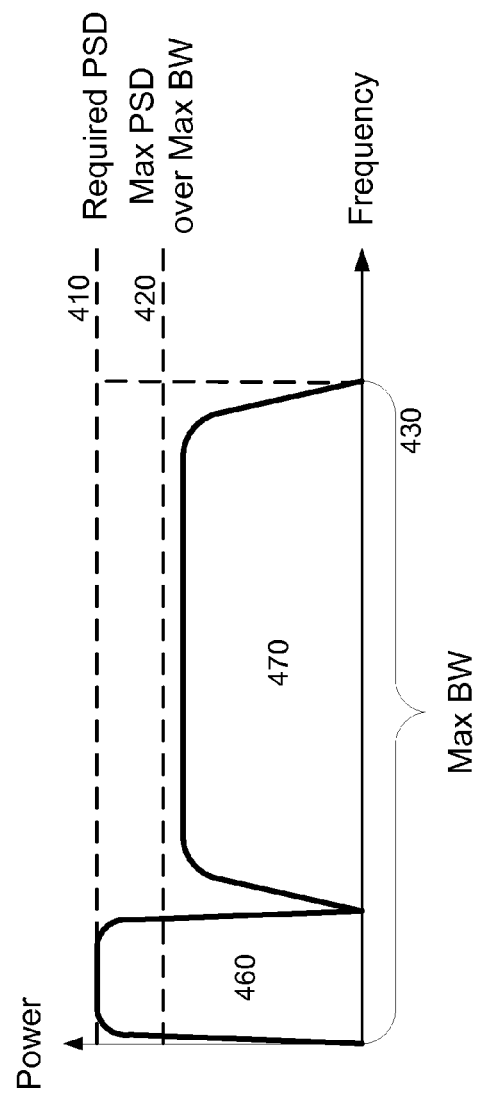
FIG. 4A
FIG. 4B

MULTI-CARRIER SATELLITE NETWORK SUPPORTING HETEROGENEOUS TERMINALS

RELATED APPLICATIONS

The present application is a non-provisional of U.S. Patent Application No. 61/411,031, entitled "Multi-Carrier Satellite Network Supporting Heterogeneous Terminals," filed Nov. 8, 2010, the contents of which are incorporated herein by reference in their entirety for all purposes.

FIELD OF THE INVENTION

This invention pertains to the fields of satellite communication systems and methods. In particular, this invention pertains to satellite communication systems providing services to populations of terminals having different characteristics and capabilities.

BACKGROUND

A satellite communication system may include a central hub and a plurality of terminals. The plurality of terminals may receive data transmitted by the hub and the hub may receive data transmitted by the plurality of terminals.

Traditionally, all terminals were stationary, i.e., remained at fixed locations at all times, including while receiving data (e.g., from a hub) and/or transmitting data (e.g., to a hub). In some cases, some terminals may have been transportable. A transportable terminal may include an antenna, which may be deployed and aligned with a satellite (either automatically or manually), but only when the transportable terminal is stationary. Therefore a transportable terminal may be operative only when stationary and thus it is in fact very similar to any ordinary stationary terminal having a similar size antenna.

More recently, satellite communication systems may also support mobile terminals. A mobile terminal may include a tracking antenna, which may maintain alignment with a satellite while the remote terminal is in motion. Thus, a mobile terminal may receive data (e.g., from a hub) and/or transmit data (e.g., to a hub) while on-the-move as well as when stationary.

The mobile environment introduces rapidly changing link conditions due to obstacles in the line-of-sight between the mobile terminal and the satellite (mainly applicable to land-operated-terminals, less to airborne or maritime terminals). Both received and transmitted signals may occasionally fade, sometimes considerably, and even become completely blocked, for example due to buildings, bridges or tunnels temporarily blocking the line-of-site between the terminal's antenna and the satellite.

There are many practical considerations affecting the sizes and shapes of tracking antennas for on-the-move satellite communication. These considerations may include, for example, the space available on a vehicle's roof, the weight of the tracking antenna, the profile of the antenna and the air flow disturbances it may cause around a moving vehicle (especially in case of an aircraft), as well as other considerations. All these considerations may cause certain tracking antennas for satellite communication on-the-move to be quite small (for example equivalent to dish antennas of 20 to 60 centimeters in diameter), and sometimes also to have a low profile (e.g., in order to minimize air resistance while on-the-move).

As an antenna becomes smaller, it has lower gain and a wider transmission/reception beam. Both of these phenomena may be undesired, as they make it more difficult to maintain communication with the terminal (e.g., due to the lower gain) and to avoid interferences to/from adjacent satellites (e.g., due to the wider beam). Since the antenna gain is in direct proportion to the antenna size and in reverse proportion to the wavelength of the transmitted and/or received signal (i.e., $G\alpha(D/\lambda)^2$, where G stands for gain, D is the diameter of the antenna dish reflector and $\lambda$ is the wavelength), one method for mitigating at least some of the effects of these phenomena is to use a higher frequency band, for example to use the Ka-band (~30 GHz uplink, ~20 GHz downlink) instead of the Ku-band (~14 GHz uplink, ~11 GHz downlink). However, the higher the frequency the greater are the effects of weather (e.g., clouds, water vapors, rain, snow, hale, etc.) on the path losses, hence it is harder to maintain the satellite link due to deeper fades.

Given all the above, in order to communicate using small antennas, e.g., for supporting on-the-move satellite communication, both a hub and a mobile terminal may need to transmit stronger signals (i.e., at higher power level) to overcome the deficiencies of the smaller antenna and of the higher frequency band, as previously described. However, this might not be possible, for example, due to regulations that may limit the spectral density (i.e., the amount of power per given bandwidth) of transmitted signals (e.g., in order to prevent interferences to adjacent satellites).

Spectrum spreading techniques (e.g., Direct Sequence, Repetitions, etc.) may be used to comply with transmission intensity regulations. These techniques may spread the total power of a signal over more bandwidth, thus reducing the spectral density of the signal below the limit allowed by the applicable regulations. However, as the spread signal requires more bandwidth, the total efficiency of a system using spreading may declines, as less user bits may be transmitted over a given bandwidth.

In a satellite communication system comprised of at least a heterogeneous population of terminals, some of the terminals may have relatively larger antennas (e.g., due to being stationary or due to being mobile but installed on ships or trucks where sufficient room exists and aerodynamic requirements are less acute), while other terminals may have very small antennas (e.g., due to being installed on aircrafts or on other vehicles that may have strict special and aerodynamic requirements). Given the differences in antenna sizes, terminals having larger antennas may use more efficient carriers (i.e., carriers that transmit and/or receive more bits per given bandwidth) while terminals having small antennas may be compelled to use more robust carriers and/or spreading techniques.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In some aspects of the invention, a satellite communication system and methods thereof are presented herein for modifying properties of a continuous carrier, in real-time or substantially in real-time, while the carrier may be actively transmitted, and without causing loss of service and/or loss of data to any receiver tracking the said carrier. The system may be configured to modify a continuous carrier over a transition period, during which a receiver may be configured to accommodate for changes in one or more features of the continuous carrier being modified so that the receiver may remain locked on the carrier throughout the modification period. The changes to the carrier may consist of frequency changes and symbol rate changes, the magnitude of which may be larger than expected in a fixed carrier. Such aspects may facilitate management of satellite space segment as they may prevent service interruptions.

Aspects of the invention also relate to modifying the symbol rate of a continuous carrier, in real-time or substantially in real-time, while the carrier may be actively transmitted, and without causing loss of service and/or loss of data to a receiver tracking the said carrier.

Further aspects of the invention relate to modifying the frequency of a continuous carrier, in real-time or substantially in real-time, while the carrier may be actively transmitted, and without causing loss of service and/or loss of data to a receiver tracking the said carrier.

In other aspects of this invention, a satellite communication system may be configured to support the needs of a heterogeneous population of terminals, while optimizing use of bandwidth for the benefit of the entire terminal population. Such systems may be configured to split the forward channel between two or more continuous carriers. A timing synchronization mechanism between the carriers may be used for at least the purpose of sharing return channel resources between terminals listening on different forward channel carriers. Methods for modifying properties of continuous carriers, in real-time or substantially in real-time, while the carriers may be actively transmitted, and without causing loss of service and/or loss of data to any terminal listening on these carriers, may be utilized to allow capacity adaptivity between the continuous carriers.

BRIEF DESCRIPTION OF THE DRAWINGS

Figure 1:
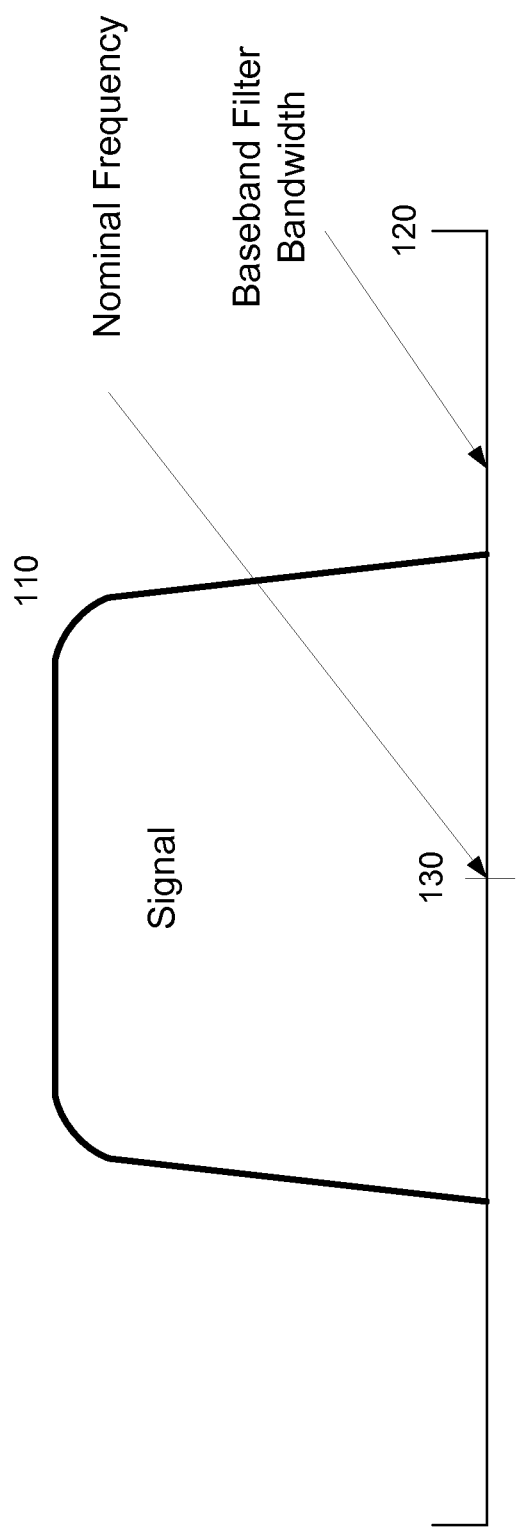

Having thus described the invention in general terms, reference will now be made to the accompanying drawings, which are not necessarily drawn to scale, and wherein:

FIG. 1 shows an example of a transmitted signal within baseband bandwidth of a receiver in accordance with aspects of the invention.

Figure 2:
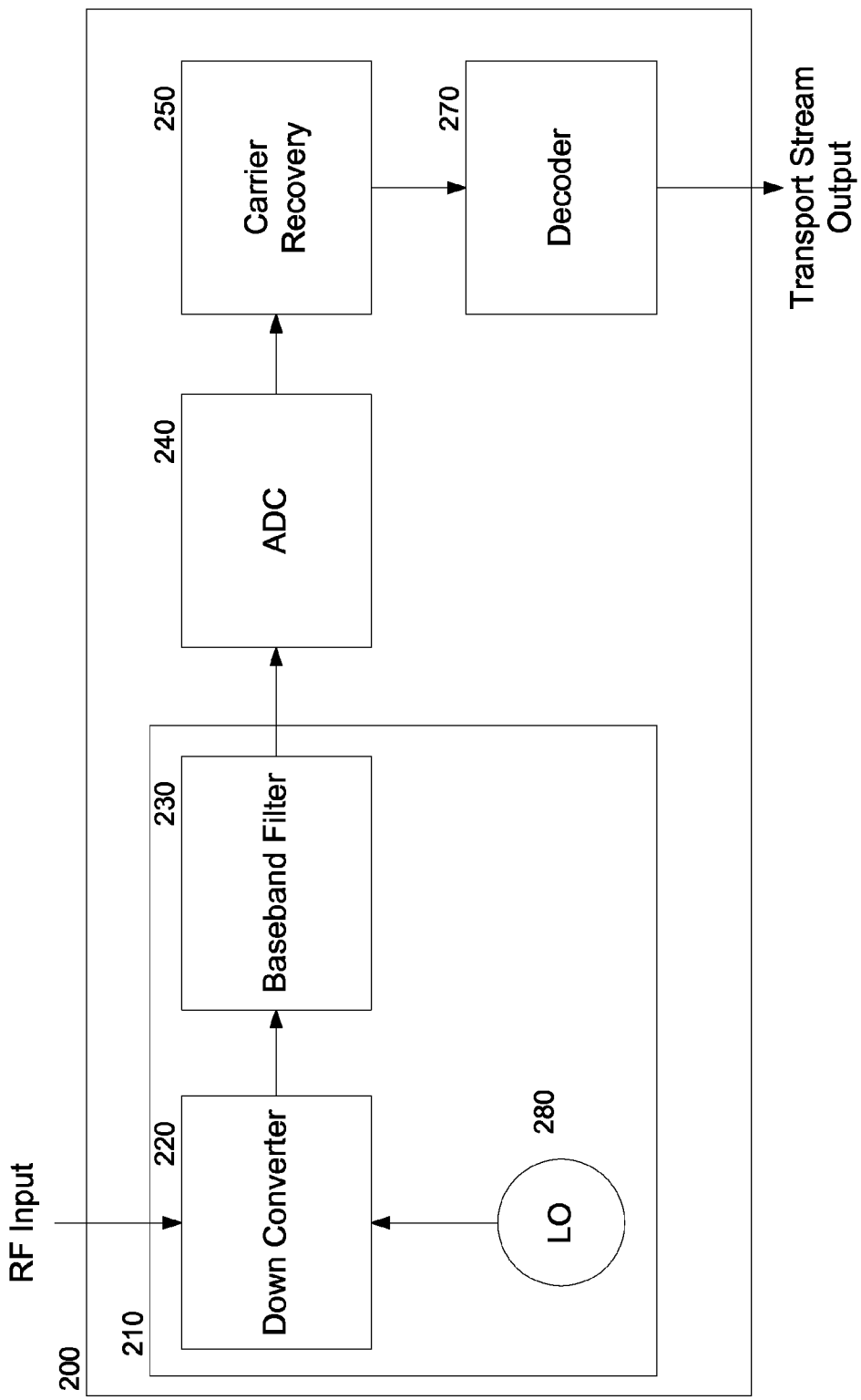

FIG. 2 shows a block diagram of an illustrative principle receiver in accordance with aspects of the invention.

Figure 3A:
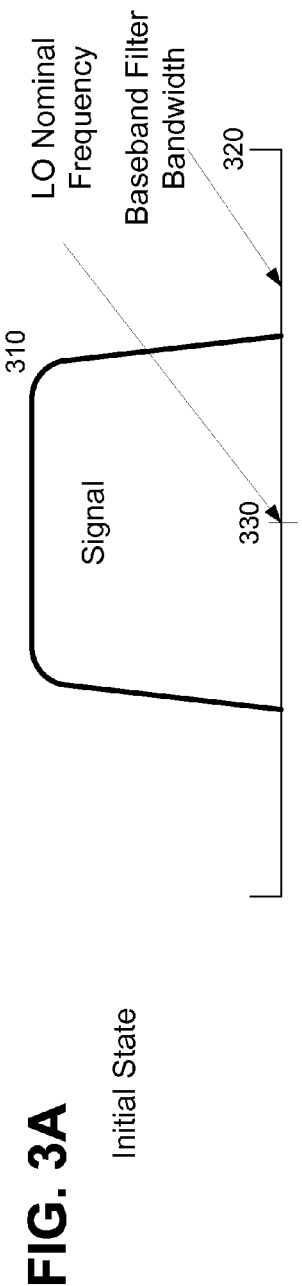
Figure 3B:
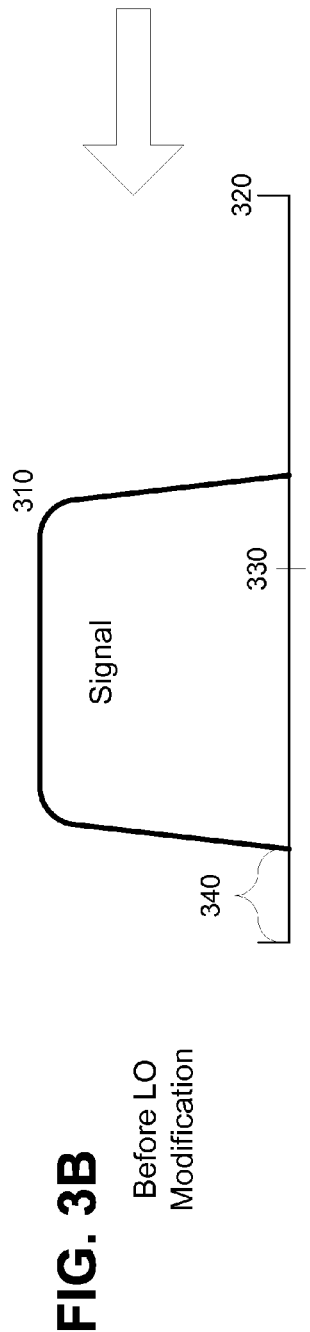
Figure 3C:
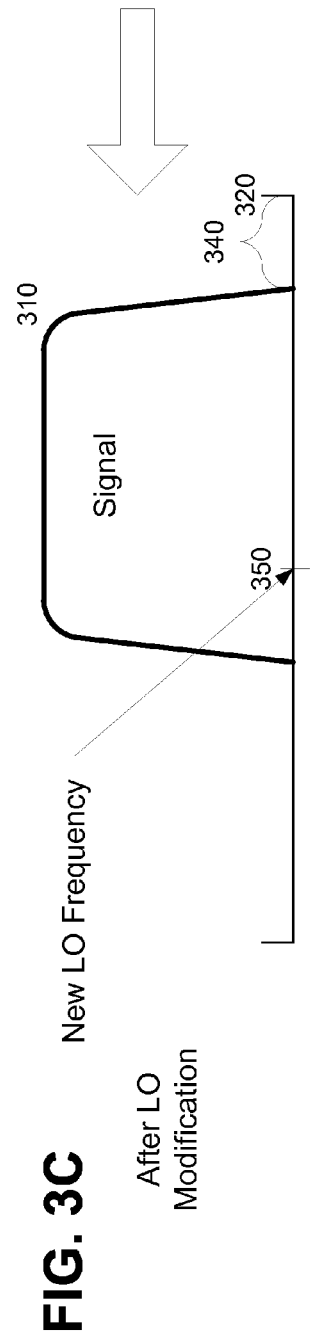

FIGS. 3A-3C show illustrations of a frequency modification process in accordance with aspects of the invention.

FIGS. 4A-4B show illustrations of bandwidth and power usage in accordance with aspects of the invention.

DETAILED DESCRIPTION

Continuous carriers, i.e., signals bearing information which are continuously transmitted without interruptions, are common in satellite communications and may be found in many types of satellite communication systems, for example, broadcasting systems (sometimes referred to as "one way" systems), Single Channel per Carrier (SCPC) systems, Very Small Aperture Terminal (VSAT) systems, and other types of satellite communication systems. In SPCP systems, the forward channel and the return channel may be continuous carriers. In VSAT systems, the forward channel may be a continuous carrier, while the return channel may be typically based on burst transmissions (e.g., using a Multi-Frequency Time Division Multiple Access (MF-TDMA) access scheme), though some VSAT systems may also feature a return channel comprising continuous carriers alongside burst channels. In some embodiments of such systems, the return channel continuous carriers may be used for satisfying prolonged demand for a constant (sometimes high) bit rate. In all these applications, continuous carriers may adhere to standards (e.g., Digital Video Broadcasting—Satellite (DVB-S) or Digital Video Broadcasting—Satellite—Second Generation (DVB-S2)) or have proprietary and nonstandard features.

Satellite communication systems (or networks) operators may often want or need to modify their continuous carriers for any one or more reasons.

One example reason for modifying a continuous carrier may be for increasing the carrier capacity based on determination or detection of an increase in demand. In some cases, a detected increase in demand may be temporary, e.g., due to an occasional activation of one or more applications requiring high bandwidth (e.g., video transmissions). In some other cases, a detected increase in demand may be of a more continuous and/or permanent nature, e.g., due to the admission of new users into the network.

An additional example reason for modifying continuous carriers may be based on a determination that carriers sharing the same satellite resource should be balanced (for example, the bandwidth and power of a transponder). In some cases, it may be necessary to increase the power and/or the bandwidth used by one carrier and therefore to compensate for that by decreasing the power and/or the bandwidth used by at least one other carrier sharing the same satellite resource (e.g., a carrier that may be temporarily not fully utilized).

In another example reason for modifying a continuous carrier, a determination may be made that a VSAT network may experience different usage profiles during different hours of the day. For example, a determination may be made that day traffic may be mostly download traffic, requiring high bit rate on the forward channel and relatively much lower capacity over the return channel. On the other hand, night traffic may be mostly the result of backup applications that may be configured to take advantage of the relatively low over-night activity and demand high capacity over the return channels rather than on the forward channel.

In yet another example reason for modifying a continuous carrier, a VSAT system may be determined to have a return channel comprised of both continuous carriers and burst channels. In such systems, a determination may be made that VSAT terminals may require relatively wide continuous carriers in order to transmit at high bit rate over the return channel, while during periods in which low capacity is required the VSAT terminals may transmit over burst channels (e.g., in MF-TDMA) or the allocated continuous carriers may be reduced in capacity and/or power. In a typical event, a first continuous carrier may be selected that is adjacent to other continuous carriers, hence reducing the first carrier bandwidth may form gaps of bandwidth where the bandwidth was previously occupied by the first carrier. It may be advantageous for an operator to modify the frequencies of the adjacent continuous carries in order to close the wasted gaps, hence allowing additional carriers to utilize the resulting free continuous bandwidth.

However, though satellite communication systems operators may often want and/or need to modify their continuous carriers, these operators may often refrain from modifying their continuous carriers and may perform such modifications only when these changes can no longer be done without. One of the main reasons for refraining may be the fact that modifications to a continuous carrier (for example changes in frequency or in symbol rate) may often result in a service interruption, i.e., in the continuous carrier being interrupted (e.g., taken down) and then restarted (e.g., brought up again) a short while afterwards. Usually, this carrier service interruption may be as short as several seconds but from an entire system point of view, even if the carrier is recovered after only a short interval, it may still take the entire communication system several minutes or more to recover.

In a satellite communication system where there are applications running at the higher communication layers (e.g., applications using TCP connections, voice sessions, etc.), a service interruption may result in these applications being interrupted and dropped (e.g., disconnection of TCP sockets, disconnection of voice sessions or video sessions, etc.), especially if the data link is lost during the service interruption or if it takes more than few seconds to restore the data link. Thus, the parameters of a continuous carrier may be modified in a manner allowing a receiver to remain locked on the carrier during the transition phase, and thus maintain uninterrupted service.

In some embodiments, one or more properties of a continuous carrier may be modified, in real-time or substantially in real-time, while the carrier is actively transmitted, without causing loss of service and/or loss of data to a receiver tracking the said carrier.

A link over a continuous carrier may be established in a sequence. For example, a transmitter may be programmed, configured or set to start transmitting the carrier signal at a nominal frequency and using a nominal symbol rate (as well as using other possible attributes, such as modulation and coding rate). A receiver may be configured to expect a continuous carrier signal having a predefined symbol rate (and in some cases also having predefined bit rate, modulation and coding rate) and/or at a predefined frequency. The receiver may be further configured to search for the continuous carrier signal within a bandwidth reflecting a maximal allowed offset from the nominal frequency. This search of the carrier signal may be performed by programming, configuring or setting at least one tuner, at least one baseband filter and at least one carrier recovery block that may be included in the receiver for at least that purpose. FIG. 1 shows a signal 110 at a nominal frequency 130. The tuner may be programmed, configured or set to the carrier's nominal frequency (e.g., frequency 130). The baseband filter may be programmed, configured or set to a minimal bandwidth (e.g., baseband filter bandwidth 120), which may be sufficient to contain the entire signal bandwidth plus additional bandwidth for accommodating the maximal allowed frequency offset. Once the tuner and the baseband filter are properly set, the carrier recovery block may be configured to perform coarse scanning of the bandwidth passed by the baseband filter using a maximal step corresponding to approximately half the symbol rate. The receiver may be further configured, once a significant power level is detected, to conclude the coarse scanning step and to initiate a fine scanning step, which may include steps of frequency and phase acquisition. Once the carrier recovery block achieves a lock on the carrier signal (e.g., frequency and phase are acquired), the receiver may stop all scanning and enter a tracking mode of operation. When in tracking mode, the receiver may be configured to compensate only for small changes in signal frequency and phase.

In order to allow substantial changes in the properties of a continuous carrier signal (e.g., a frequency property, a symbol rate property, etc.) and at the same time to avoid service interruption (for example, as a result from losing lock on the carrier signal at the receiver), the receiver may modify tracking parameters (e.g., tuner center frequency, baseband filter width, etc.) and the transmitter may restrict the rate in which modifications may be applied to the transmitted carrier signal, so that the signal may remain within the boundaries of the receiver's tracking loops. In addition, a trade off may be used in modifying the parameters of the receiver's tracking loops, as excessive enlargement of the tracking loops may lead to degradation in the receiver performance (i.e., as enlarged loops may be more vulnerable to thermal noise). During the transition phase, the receiver may be more vulnerable and more susceptible to errors and therefore it may be advantageous to notify the receiver in advance as to the new parameters designated for the continuous carrier signal. Thus, during the transition phase the receiver's tracking loops may automatically track the carrier and once arriving at the designated parameters (e.g., frequency, symbol rate, etc.), the receiver may revert to its regular tracking parameters.

Both the transmitter and the receiver may be configured, managed and/or controlled in a manner preventing any modification of any one or more varying parameters from leading to temporary interruption or modification of any fixed parameter. For example, when the transmitter is configured, programmed or set to change the symbol rate of the continuous carrier signal, the moment of change may be preferably selected as a moment between frames (for example, baseband frames in case of a DVB-S2 carrier, or MPEG frames in case of a DVB-S carrier), or at least a moment between symbols (i.e., refraining from modification (e.g., of samples) within a symbol). Configuring, programming or setting any of the transmitter parameters may be done without leading to any interruption of the transmitter's RF (Radio Frequency) output. Care may be taken to avoid undesired conditions, for example, but not limited to, any automatic shutdown of the signal power or momentary wander of the carrier frequency (e.g., due to race conditions that might exist when programming a PLL used for generating the transmitted signal). Similar considerations may also apply to the receiver. Any configuring, programming or setting any of the receiver parameters may be done while avoiding any temporary muting of a local oscillator reference that may be provided to a tuner included in the receiver, or any other similarly undesired effects.

A satellite communication system may include a transmitter configured to transmit a continuous carrier signal bearing information, and at least one receiver configured to receive the transmitted signal. For example, FIG. 2 shows a block diagram of a principle receiver 200, which may be similar to at least one receiver included in said satellite communication system. Receiver 200 in this example may be configured to include at least a tuner 210, which may further include a frequency down converter 220, a baseband filter 230 and a local oscillator (LO) 280, an Analogue to Digital Converter (ADC) 240, a carrier recovery block 250, which may typically include a coarse frequency acquisition loop and a phase and frequency tracking loop (e.g., a Costas tracking loop), and a decoder 270.

Frequency down converter 220 may be configured to use LO 280 for at least the purpose of down-converting the received signal to baseband. Baseband filter 230 may be used for minimizing the input of unwanted signals and therefore may facilitate the design in terms of matching the resolution of ADC 240 to predefined specification. In some embodiments, the receiver 200 may be configured not to support a large range of symbol rates, and baseband filter 230 may be a fixed and non-programmable one. In other embodiments, the receiver 200 may be configured to support a large range of symbol rates, and a tunable baseband filter 230 may be used and optimally tuned to suit the symbol rate of the designated carrier. In such examples, tunable filters may be found in RF Integrated tuners.

Carrier recovery block 250 may be configured to track phase and frequency of a received continuous signal, such as the signal transmitted by the transmitter (e.g., using the coarse frequency acquisition loop and the phase and frequency tracking loop included in it). Once locked on the received signal, the tracking loop may be configured, programmed or set to converge and to maintain tracking bandwidth sufficient for tracking frequency drifts (for example, drifts that may result from frequency fluctuations in a Low Noise Block (LNB)) and phase fluctuations (e.g., due to phase noise).

It should be appreciated by anyone skilled in the art that FIG. 2 portrays only one example of elements applicable for the description herein and that any actual implementation of a receiver may include many different or additional functional blocks (for example, automatic gain control (AGC), de-interleaver, symbol de-mapper, etc.).

In one aspect of the invention, presented herein is a method for modifying the symbol rate of a continuous carrier, in real-time or substantially in real-time, while the carrier may be actively transmitted, and without causing loss of service and/or loss of data to a receiver tracking the said carrier.

Upon determining a need to change the symbol rate property of the transmitted signal, the transmitter may be configured to send and the receiver may be configured to receive a notification of the expected change. The notification may be sent over the transmitted signal itself, prior to performing any modification, and may include information for a new determined symbol rate. The receiver may be configured, upon receiving a notification of an expected change in the symbol rate of the received signal, to enlarge the bandwidth of the tracking loop included in the receiver. In some embodiments, the receiver may be configured to enlarge the tracking loop bandwidth by a factor between 2 and 4, hence setting the tracking loop bandwidth between twice and four times the regular tracking loop bandwidth.

In some embodiments of the invention, the system may also include a return channel, and the receiver may send an acknowledgement to the transmitter via the return channel, notifying the transmitter that the change notification has been received and that the receiver may be ready for the symbol rate modification. In some of these embodiments, the acknowledgement message may also include information regarding the receiver's tracking loop bandwidth, so that the transmitter may be able to determine the maximal modification step, as described herein. In other embodiments, no return channel may be available, or the transmitter may determine that waiting for and considering acknowledgements from many terminals may be impractical. In such cases, the transmitter may be configured to wait a predefined time interval from sending the notification before commencing with the change process.

Upon determining that the change process may commence, the transmitter may be configured to change the symbol rate property of the transmitted signal in steps not exceeding the receiver's tracking loop bandwidth. In some embodiments, the transmitter may be configured to change the symbol rate property of the transmitted signal in steps no greater than half the tracking loop bandwidth. In addition, the transmitter may be further configured to allow a time interval between two consecutive modifications of the symbol rate property, wherein this time interval may be longer than the interval required for the receiver's tracking loop to converge. In some embodiments, the receiver may include a tunable baseband filter, and may be configured to modify the baseband filter and optimally tune it to suit changes in the signal bandwidth, which may result from the changes in the received signal symbol rate.

Upon reaching the determined new symbol rate, the transmitter may be configured to send a second notification to the receiver, declaring the end of the symbol rate modification process. Upon receiving such notification, the receiver may configure, program or set its tracking loop bandwidth to support regular tracking of the signal given its modified symbol rate. In some embodiments, the receiver may be configured to revert to the regular tracking mode once the designated symbol rate has been reached, without depending on a second notification from the transmitter.

Modifying the symbol rate of the transmitted signal may result in modifications to its power spectral density, unless the output power of the transmitted signal is simultaneously modified. It may be advantageous to configure the transmitter to interleave commands for gradually modifying the power of the transmitted signal with modifications made to the signal symbol rate, for at least the purpose of maintaining the same power spectral density throughout the transition period. In some embodiments, the transmitter may be configured to change the signal output power only at the end of the symbol rate modification process, i.e., once the signal symbol rate is the determined new symbol rate. If the symbol rate is decreased during the modification process, the signal power may be decreased at the end of the modification process without causing any degradation in performance during the modification process itself. However, if the symbol rate is increased during the modification process, the transmitter may be configured to modify the coding rate (e.g., the forward error correction (FEC)) of the transmitted signal to a more robust coding rate for the duration of the modification process in order to match the decline in power spectral density as the symbol rate is increased. Once the signal symbol rate is the determined new symbol rate, the transmitter may be configured to increase the output power, restore the power spectral density and thereafter the original coding rate. Alternatively, in other embodiments, wherein the determined new symbol rate is higher than the current symbol rate, the output power may be increased prior to the actual symbol rate modification to match the power required for achieving the necessary power spectral density at the determined new higher symbol rate.

In another aspect of the invention, presented herein is a method for modifying the frequency of a continuous carrier, in real-time or substantially in real-time, while the carrier may be actively transmitted, and without causing loss of service and/or loss of data to a receiver tracking the said carrier.

Upon determining a need to change the frequency property of the transmitted signal, the transmitter may be configured to send and the receiver may be configured to receive a notification of the expected change. The notification may be sent over the transmitted signal itself, prior to performing any modification, and may include information for a new determined frequency. The receiver may be configured, upon receiving a notification of an expected change in the frequency of the received signal, to enlarge the bandwidth of the tracking loop included in the receiver. In some embodiments, the receiver may be configured to enlarge the tracking loop bandwidth by a factor between 2 and 4, hence setting the tracking loop bandwidth between twice and four times the regular tracking loop bandwidth.

In some embodiments of the invention, the system may also include a return channel, and the receiver may send an acknowledgement to the transmitter via the return channel, notifying the transmitter that the change notification has been received and that the receiver may be ready for the frequency modification. In some of these embodiments, the acknowledgement message may also include information regarding the receiver's tracking loop bandwidth, so that the transmitter may be able to determine the maximal modification step, as described herein. In other embodiments, no return channel may be available, or the transmitter may determine that waiting for and considering acknowledgements from many terminals may be impractical. In such cases, the transmitter may be configured to wait a predefined interval from sending the notification before commencing with the change process.

Upon determining that the change process may commence, the transmitter may be configured to change the frequency property of the transmitted signal in steps not exceeding the receiver's tracking loop bandwidth. In some embodiments, the transmitter may be configured to change the frequency property of the transmitted signal in steps not greater than half the receiver's tracking loop bandwidth. In addition, the transmitter may be further configured to allow a time interval between two consecutive modifications of the frequency property, wherein this time interval may be longer than the interval required for the receiver's tracking loop to converge.

However, the process for changing the signal frequency may be more complicated than the process for changing the signal symbol rate. This additional complexity may be related to the fact that the receiver may have to modify the frequency of the local oscillator (LO) feeding the down converter in order to keep track of the signal.

FIG. 3 illustrates an example of receiver actions during a frequency modification process. Initially, as shown in FIG. 3A, received signal 310 is at its nominal frequency and the LO is set accordingly to frequency 330. Upon being notified of a signal frequency modification and in addition to being configured to enlarge the tracking loop bandwidth (as previously described), the receiver may be further configured to periodically or constantly poll readings of the instantaneous frequency offset of the received signal relative to the current nominal frequency, to which the current setting of the LO corresponds (e.g., $f_1$). As the frequency of received signal 310 changes (e.g., see FIG. 3B), the receiver may be further configured to determine from said frequency offset readings that an edge of received signal 310 is at a predefined distance 340 from a corresponding edge of the baseband filter. Upon so determining, the receiver may be configured to modify the frequency of the LO feeding the down-converter. The receiver may determine a new LO frequency 350 (e.g., $f_2$) so that the other edge of received signal 310 may be at the same predefined distance 340 from the other edge of the baseband filter after the LO frequency change may become effective, as shown in the example of FIG. 3C. Given the bandwidth of received signal 310 to be $BW_S$, the baseband filter bandwidth 320 to be $BW_{BBF}$, and the predefined distance 340 to be $\Delta F$, then the new LO frequency 350 (e.g., $f_2$) may be calculated as:

$$f_2 = f_1 \pm (BW_{BBF} - BW_S - 2\Delta F)$$

The decision whether to add to the LO frequency or subtract from it may depend on the specific baseband filter edge to which the signal is approaching, e.g., as shown in FIG. 3B.

The receiver may be configured to modify the LO frequency as necessary, for example, as long as the signal frequency modification process is in progress. During the modification process, the receiver may be configured to modify the LO frequency more slowly than in other instances, in order to avoid interruptions or loss of lock on the received signal. In some embodiments, the receiver may be configured to constantly modify the LO frequency while striving to minimize the frequency offset. As the LO frequency may be constantly modified, each modification may be relatively small, hence preserving lock on the received signal by the receiver may be more straightforward. Upon reaching the designated frequency, the transmitter may be configured to send a second notification to the receiver, declaring the end of the frequency modification process. Upon receiving such notification, the receiver may be configured to make a final modification to the LO frequency and thereafter (e.g., after the tracking loop converges) to configure, program or set its tracking loop bandwidth to support regular tracking of the signal. In some embodiments, the receiver may be configured to revert to the regular tracking mode once the determined new frequency has been reached, without depending on a second notification from the transmitter.

In some embodiments, the receiver may include a tunable baseband filter, and the receiver may be configured to modify and optimally tune the baseband filter even during a frequency modification process, though the signal bandwidth might not change during this process. A temporary enlargement of the baseband filter may be advantageous, as broadening the baseband filter may minimize the need for LO frequency modifications during the frequency modification process. Once the signal reaches the designated frequency, the receiver may be configured to restore the baseband filter to an optimal bandwidth.

Apart from the baseband filter, a demodulator included in the receiver may also include a digital filter. The receiver may be further configured to modify this filter as well in order to accommodate for the changes.

The above described methods may hold several potential advantages when designing various a satellite communication systems. In one potential advantage of certain systems, maintaining connectivity throughout a continuous signal modification may require no redundant hardware, both at the transmitter end and at the receiver end. In such systems, instead of allocating temporary space segment for a temporary carrier and using redundant hardware at both ends for maintaining a link over the temporary carrier while the main carrier is being adjusted, the above described methods may allow the main carrier to be modified without requiring temporary bandwidth and redundant hardware, and while maintaining the system in a fully operative state. In another potential advantage of certain systems, since the modification process may no longer result in service interruptions, a true dynamic behavior over time may become possible even when using continuous carrier signals.

In another aspect of this invention, a satellite communication system is presented herein, wherein the system may be configured to support the needs of a heterogeneous population of terminals, while optimizing use of bandwidth for the benefit of the entire terminal population.

In certain embodiments, satellite communication systems may be comprised of a hub and a plurality of heterogeneous terminals. In such systems, some of the terminals may have relatively larger antennas (e.g., due to being stationary or due to being mobile but installed where sufficient room exists and aerodynamic requirements are less acute), while other terminals may have relatively small antennas (e.g., due to being installed on aircrafts or on other vehicles that may have strict special and aerodynamic requirements). The hub may be configured to transmit and the terminals may be configured to receive data over a forward channel. The terminals may be configured to transmit and the hub may be configured to receive data over a return channel. In such satellite communication systems, the hub and/or the plurality of terminals may include computing devices including one or more processors and memory storing software. Computer executable instructions and data used by the processor(s) and other components of the hub and/or terminals may be stored in a storage facility such as a memory. The memory in these devices may comprise any type or combination of read only memory (ROM) modules or random access memory (RAM) modules, including both volatile and nonvolatile memory such as disks. The software of the hub and/or terminals of the satellite communication system may be stored within the memory of these devices to provide instructions to the processor(s) such that when the instructions are executed, the processor(s), the devices are caused to perform various functions or methods such as those described herein. Software may include both applications and operating system software, and may include code segments, instructions, applets, pre-compiled code, compiled code, computer programs, program modules, engines, program logic, and combinations thereof. Computer executable instructions and data may further be stored on computer readable media including electrically erasable programmable read-only memory (EEPROM), flash memory or other memory technology, CD-ROM, DVD or other optical disk storage, magnetic cassettes, magnetic tape, magnetic storage and the like. Some or all of the instructions implemented by processor or other components so as to carry out the operations described herein may also be stored as hardwired instructions (e.g., logic gates). For example, the processor could include one or more application specific integrated circuits (ASICs) configured to carry out operations such as those described herein.

In certain embodiments, the forward channel may be implemented as a single continuous carrier, as illustrated in the example of FIG. 4A. However, in some examples, due to a heterogeneous nature of a terminal population (at least in terms of antenna size but potentially also in terms of satellite contour, extreme differences in weather conditions, etc.) and a large dynamic range that may be required for supporting them, satellite communication systems might not use a single continuous carrier for servicing all the terminals.

In order to support one or more smaller terminals on forward channel continuous carrier 450 servicing the entire terminal population (e.g., to ensure that the smaller terminals may receive the forward channel signal at a sufficient signal-to-noise ratio and also may have sufficient margin to overcome degradations, for example, due to fade), forward channel continuous carrier 450 may have to be transmitted at very high power spectral density 410 to compensate for the low gain of the receiving antennas of the smaller terminals. In some cases, the power spectral density 410 may be even higher than maximal power spectral density 420, which a satellite may support for a signal occupying the entire available bandwidth 430 (e.g., a transponder bandwidth). Thus, in such cases, some of the bandwidth may not be usable due to power limitations. In addition to said high power spectral density, the use of very robust modulations, coding rates, and/or spectrum spreading may also be required, and hence carrier 450 may provide a very low throughput relative to the bandwidth and power it requires. Consequently, the entire system may be serviced by a very low throughput forward channel carrier on the account of the first smaller terminal to be serviced by the system, whether the smaller terminal is actually active or not. Furthermore, all broadcasted traffic (e.g., management traffic) might need to be transmitted in the most robust manner, to insure reception by all terminals, including the smaller ones. Therefore, this broadcast traffic may require a relatively large amount of bandwidth, even at low bit rates. A similar situation may exist with traffic sent to smaller terminals in unicast. Such traffic may be sent in a very robust manner, and thus may drive the total throughput of the system over the forward channel down. For example, an amount of bandwidth over the forward channel may be used to support only a few terminals with small antennas, whereas the same amount of bandwidth might otherwise be used for supporting many more terminals with larger antennas.

Accordingly, in certain embodiments, a forward channel may be composed of two or more continuous carriers, wherein each carrier may be configured in a manner best suited for servicing a different part of the general terminal population, as shown in the example of FIG. 4B. For example, carrier 460 may be configured to service terminals having small antennas. This carrier may be configured to use a relatively small part of the available bandwidth and high power spectrally density 410 (which may even exceed maximal power spectral density 420, which a satellite may support for a signal occupying the entire available bandwidth 430), as well as robust modulation, coding and/or spectrum spreading. On the other hand, at least one other carrier, for example carrier 470, may be configured to service terminals having (relatively) large antennas. Carrier 470 may be configured to use the remaining bandwidth and power available from the satellite (e.g., for the applicable transponder). Due to the bandwidth difference between carriers 460 and 470, the power spectral density of carrier 470 may be only slightly lower than maximal power spectral density 420, hence high spectral efficiency modulation and coding may be still supported on carrier 470 even though it may be transmitted at a lower power spectral density than carrier 460. In certain examples, if the satellite resources (e.g., bandwidth and power) are properly divided between the carriers, such an arrangement may lead to a higher overall throughput than the single carrier arrangement.

While the principle of splitting a channel into multiple carriers has been demonstrated in the above example by splitting a forward channel signal in a hub-spoke system into two carriers, it should be appreciated by anyone skilled in the art that the same principle may apply to other types of channels in other types of systems, wherein the split may be into any number of carriers greater or equal to two.

However, while splitting the forward channel into two or more carriers may improve the throughput of the system, in some cases said splitting may raise some potential difficulties that may have to be resolved in order to make such a system truly dynamic and adaptive. One such potential difficulty may be timing synchronization. Another potential difficulty may be the adaptivity between the carriers.

In some cases, return link traffic may depend on timing distributed over the forward channel. For example, where DVB-S2 is used, program clock reference (PCR) timestamps may be transmitted over the forward channel signal to enable a terminal transmitting in MF-TDMA (e.g., in accordance with Digital Video Broadcasting-Return Channel via Satellite (DVB-RCS) recommendations) to transmit in accurate timing and in synchronization with return channel allocations provided by a hub. By splitting the forward channel into two or more carriers, the timing distributed over the different carriers may be different, and hence, a full split of the network into two or more homogeneous networks may potentially occur. Such split may potentially lead to waste of bandwidth and throughput (e.g., due to no option for sharing at least the return channel bandwidth between the two populations), which may exceed the throughput which may have been gained from the splitting of the forward channel to begin with. In such examples, in order for such splitting of the forward channel into two or more carriers to be worthwhile, the timing distributed over all the split carriers may have to be identical. For instance, a synchronization mechanism may be used for synchronizing the timing in all the transmitters used for transmitting the forward channel carriers.

In certain embodiments, the forward channel may be implemented as a single continuous carrier, and the entire bandwidth of the carrier can be used at all times. Using adaptive techniques (e.g., Adaptive Coding and Modulation (ACM)), the number of bits per bandwidth unit may be periodically or continuously changed to fit the reception capabilities of the receiving terminal. However, since the carrier may be primarily configured to provide service to all terminals, including those with smaller antennas, the range of adaptivity may be limited and/or the small antenna terminals may drive the total throughput down due to requiring more robust transmission (i.e., lower number of bits per bandwidth unit). In such examples, when the forward channel may be split into two or more carriers, the total throughput may be increased and the larger terminals may achieve much higher throughput (as they are not held back by the smaller antenna terminals). However, it is likely that one of the carriers may be fully utilized (and possibly may be under congestion), while other one or more carriers are only partly utilized (or possibly might not be utilized at all). With the bandwidth split between the carriers in such examples, the total throughput in the network again may be limited to less than achievable using a single carrier.

However, using the previously described methods for modifying symbol rate and frequency of a continuous carrier, in real-time or substantially in real-time, while the carrier may be actively transmitted, and without causing loss of service and/or loss of data to a receiver tracking the said carrier, it may be possible to practice adaptivity in a satellite communication system having a forward channel split into two or more continuous carriers.

In certain embodiments, determinations may be made that a demand for capacity over a first forward channel carrier may be very high, and that a demand for capacity on one or more other forward channel carriers may be relatively low (e.g., lower than a predefined percentage of the total capacity for that carrier). Based on such determinations, the satellite system may be configured to change symbol rate and frequency properties of the first and the at least second carriers in order to enlarge the capacity over the first carrier at the expense of reducing the capacity over the other carriers, wherein said changes in symbol rate and frequency may be performed while the first carrier and the other carriers may be actively transmitted and without causing loss of service and/or loss of data to any of the serviced terminals listening on these carriers. In some embodiments, in addition to modifying symbol rate and/or frequency characteristics of the first and/or the one or more other carriers, the system may be further configured to modify the output power of each modified carrier for at least the purpose of maintaining the power spectral density of each carrier. In other embodiments, the system may be configured to modify the output power of said carrier for at least the purpose of balancing their power under a total power limitation that may exist for a resource shared by said carriers and/or under applicable regulatory limitations.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

We claim:

1. A method comprising:
   modifying a symbol rate of a transmitted continuous carrier signal, in real-time or substantially in real-time, wherein the signal is modified while the signal is actively transmitted from a transmitter to a receiver in a satellite communication system, and wherein the signal is modified without causing loss of service, service interruption or loss of data at the receiver, wherein modifying the symbol rate of the transmitted continuous carrier signal comprises:
   determining, at the transmitter, a need to change the symbol rate of the transmitted signal to a new symbol rate;
   sending a first notification to the receiver of the expected symbol rate change;
   receiving an acknowledgement from the receiver, or waiting for a predefined time interval to expire;
   making, at the transmitter, one or more symbol rate changes to the transmitted signal, wherein the time interval between any two consecutive symbol rate changes is longer than the time interval required for the receiver's tracking loop to converge, and wherein each symbol rate change does not exceed the receiver's tracking loop bandwidth, and wherein the moment of each change is selected as a moment between frames or between transmitted symbols;
   determining that the new symbol rate has been reached; and
   sending a second notification to the receiver upon determining that the new symbol rate has been reached, indicating the end of the symbol rate modification process.

2. The method of claim 1, wherein said notifications are sent over the transmitter signal.

3. The method of claim 1, wherein said first notification includes at least new symbol rate information.

4. The method of claim 1, wherein the transmitter is configured to change the symbol rate of the transmitted signal in steps no greater than half of the receiver's tracking loop bandwidth.

5. The method of claim 1, wherein the transmitter is configured to interleave commands for gradually modifying the power of the transmitted signal with modifications made to the signal symbol rate.

6. The method of claim 1, wherein the symbol rate of the transmitted continuous carrier signal is modified without causing the receiver to lose tracking of the transmitted carrier.

7. A method comprising:
modifying a symbol rate of a transmitted continuous carrier signal, in real-time or substantially in real-time, wherein the signal is modified while the signal is actively transmitted from a transmitter to a receiver in a satellite communication system, and wherein the signal is modified without causing loss of service, service interruption or loss of data at the receiver, wherein modifying the symbol rate of the transmitted continuous carrier signal comprises:
receiving, at the receiver, a first notification from the transmitter regarding an expected symbol range change;
enlarging a tracking loop bandwidth of the receiver upon receiving said first notification;
modifying a baseband filter included in the receiver one or more times in accordance with changes in signal bandwidth resulting for symbol rate changes;
receiving a second notification from the transmitter indicating conclusion of the symbol rate change process, or independently determining that a new symbol rate has been reached; and
setting, at the receiver, the tracking loop bandwidth to support tracking of the signal based on its modified symbol rate, upon receiving said second notification or upon determining that the new symbol rate has been reached.

8. The method of claim 7, wherein following the step of enlarging the tracking loop bandwidth, the receiver is further configured to determine whether a return channel is available, and to send an acknowledgement to the transmitter over the return channel if a return channel is available, wherein the acknowledgement indicates that the receiver is ready for a symbol rate change.

9. The method of claim 8, wherein the acknowledgement further includes information regarding the receiver's tracking loop bandwidth.

10. The method of claim 7, wherein the symbol rate of the transmitted continuous carrier signal is modified without causing the receiver to lose tracking of the transmitted carrier.

11. A method comprising:
modifying a frequency of a transmitted continuous carrier signal, in real-time or substantially in real-time, wherein the frequency is modified while the signal is actively transmitted from a transmitter to a receiver in a satellite communication system, and wherein the frequency is modified without causing loss of service, service interruption or loss of data at the receiver, wherein modifying the frequency of the transmitted continuous carrier signal comprises:
determining, at the transmitter, a need to change the frequency of the transmitted signal to a new frequency;
sending a first notification to the receiver of the expected frequency change;
receiving an acknowledgement from the receiver, or waiting for a predefined time interval to expire;
making, at the transmitter, one or more frequency changes to the transmitted signal, wherein the time interval between any two consecutive changes is longer than the time interval required for the receiver's tracking loop to converge, and wherein each change does not exceed the receiver's tracking loop bandwidth, and wherein the moment of each change is selected as a moment between frames or between transmitted symbols;
determining that the new frequency has been reached; and
sending a second notification to the receiver upon determining that the new frequency has been reached, indicating the end of the frequency modification process.

12. The method of claim 11, wherein said notifications are sent over the transmitter signal.

13. The method of claim 11, wherein said first notification includes at least new frequency information.

14. The method of claim 11, wherein the transmitter is configured to change the frequency of the transmitted signal in steps not greater than half of the receiver's tracking loop bandwidth.

15. The method of claim 11, wherein the frequency of the transmitted continuous carrier signal is modified without causing the receiver to lose tracking of the transmitted carrier.

16. A method comprising:
modifying a frequency of a transmitted continuous carrier signal, in real-time or substantially in real-time, wherein the frequency is modified while the signal is actively transmitted from a transmitter to a receiver in a satellite communication system, and wherein the frequency is modified without causing loss of service, service interruption or loss of data at the receiver, wherein modifying the symbol rate of the transmitted continuous carrier signal comprises:
receiving, at the receiver, a first notification from the transmitter regarding an expected frequency change;
enlarging a tracking loop bandwidth of the receiver upon receiving said first notification;
enlarging a bandwidth of a baseband filter included in the receiver upon receiving said first notification;
receiving a second notification from the transmitter indicating conclusion of the frequency change process, or independently determining that the new frequency has been reached;
making a last modification to the local oscillator frequency upon receiving said second notification, or determining that the new frequency has been reached; and
setting, at the receiver, the tracking loop bandwidth to support tracking of the signal and restoring the baseband filter bandwidth to its original setting upon the tracking loop converging on the last local oscillator frequency modification.

17. The method of claim 16, further including the following steps after enlarging the bandwidth of the baseband filter:
polling readings of the instantaneous frequency offset of the received signal relative to the current nominal frequency to which the current setting of the local oscillator corresponds;
determining from said frequency offset readings that an edge of the signal is at a predefined distance from a corresponding edge of the baseband filter; and
modifying, at the receiver, the frequency of the local oscillator upon determining that an edge of the received continuous carrier signal is at a predefined distance from a corresponding edge of the baseband filter, wherein the new local oscillator frequency is selected so that the other edge of signal will be at the same predefined distance from the other edge of the baseband filter after the local oscillator frequency change is effective, and wherein the local oscillator frequency is modified in a slow enough rate for avoiding interruptions or loss of lock on the signal.

18. The method of claim 16, wherein following the step of enlarging the tracking loop bandwidth, the receiver is further configured to determine whether a return channel is available, and to send an acknowledgement to the transmitter over the return channel if a return channel is available, wherein the acknowledgement indicates that the receiver is ready for a frequency change.

19. The method of claim 18, wherein the acknowledgement further includes information regarding the receiver's tracking loop bandwidth.

20. The method of claim 16, wherein the receiver is further configured to modify the bandwidth of a digital filter included in a demodulator in conjunction with modifying the baseband filter bandwidth and the tracking loop bandwidth.

21. The method of claim 16, wherein the frequency of the transmitted continuous carrier signal is modified without causing the receiver to lose tracking of the transmitted carrier.

22. A satellite communication system, comprising:
a hub; and
a plurality of heterogeneous terminals, wherein the terminals differ in their reception capability,
wherein the hub is configured to transmit and the terminals are configured to receive data over a forward channel, the system is configured to split the forward channel between at least two continuous carrier signals, wherein each of the at least two carrier signals is configured to service a different part of the terminal population based on reception capabilities of the terminals, and wherein the system is further configured to:
determine that a demand for capacity over a first forward channel carrier is relatively high and that demand for capacity over a second forward channel carrier is relatively low; and
change at least one of the symbol rate or the frequency of the first and the second carriers in order to enlarge the capacity over the first carrier and reduce the capacity over the second carrier, wherein said changes to at least one of the symbol rate or the frequency are performed while the first and the second carriers are actively transmitted and without causing loss of service or loss of data to any of the serviced terminals listening on said carriers.

23. The system of claim 22, wherein the system is further configured, upon changing symbol rate of a carrier, to modify the output power of the carrier in order to maintain its power spectral density.

24. The system of claim 22, wherein the system is further configured, upon changing symbol rate of a carrier, to modify the output power of any one or more other carriers in order to balance the total forward channel power under a total power limitation.

25. The system of claim 22, wherein the system includes a timing synchronization mechanism configured to synchronize transmitters used for transmitting two or more forward channel carriers.

* * * * *